United States Patent
Ahmad et al.

(10) Patent No.: US 11,137,810 B2
(45) Date of Patent: Oct. 5, 2021

(54) USB CHARGER WITH AUTOMATIC SLEEP MODE

(71) Applicant: La-Z-Boy Incorporated, Monroe, MI (US)

(72) Inventors: Tahir Ahmad, Monroe, MI (US); Jaime McPherson, Signal Mountain, TN (US)

(73) Assignee: La-Z-Boy Incorporated, Monroe, MI (US)

( * ) Notice: Subject to any disclaimer, the term of this patent is extended or adjusted under 35 U.S.C. 154(b) by 108 days.

(21) Appl. No.: 16/563,415

(22) Filed: Sep. 6, 2019

(65) Prior Publication Data

US 2021/0075241 A1 Mar. 11, 2021

(51) Int. Cl.
*G06F 1/26* (2006.01)
*H02J 7/00* (2006.01)
*H02J 7/08* (2006.01)

(52) U.S. Cl.
CPC ............ *G06F 1/266* (2013.01); *H02J 7/0003* (2013.01); *H02J 7/085* (2013.01); *H02J 7/00* (2013.01); *H02J 7/00034* (2020.01); *H02J 7/00045* (2020.01); *H02J 2207/40* (2020.01)

(58) Field of Classification Search
CPC .. G06F 1/266; G06F 1/26; H02J 7/085; H02J 7/0003; H02J 7/00034; H02J 7/00; H02J 7/00045; H02J 2207/40; H02J 7/08
See application file for complete search history.

(56) References Cited

U.S. PATENT DOCUMENTS

| | | | |
|---|---|---|---|
| 2016/0254689 A1* | 9/2016 | Lee | H02J 7/00 320/107 |
| 2017/0318982 A1* | 11/2017 | Campbell | H02J 50/10 |
| 2019/0067952 A1* | 2/2019 | Kirchoff | A24F 40/90 |
| 2019/0157884 A1* | 5/2019 | Lin | H02J 7/00036 |

OTHER PUBLICATIONS

Janet Heath, "Ground rules:earth, chassis, and signal ground," https://www.analogictips.com/faq-ground-rules-earth-chassis-signal-ground-faq/; Oct. 28, 2016, pp. 1-3. (Year: 2016).*

* cited by examiner

*Primary Examiner* — Vuthe Siek
(74) *Attorney, Agent, or Firm* — Harness, Dickey & Pierce, P.L.C.

(57) ABSTRACT

A charger comprises an input circuit that receives power from a power source, a converter circuit, an output circuit, and a switching circuit. The converter circuit is connected between the input circuit and a signal ground of the charger and converts the power from a first voltage to a second voltage. The signal ground is connected to a chassis ground of the charger. The output circuit is connected between an output of the converter circuit and the signal ground and the chassis ground, and outputs the second voltage to an output connector of the charger. The switching circuit is connected between the output of the input circuit and an electrically conducting casing of the output connector, and controls the converter circuit. The switching circuit and the electrically conducting casing of the output connector are not connected to the signal ground and the chassis ground of the charger.

20 Claims, 8 Drawing Sheets

USB CHARGER WITH AUTOMATIC SLEEP MODE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to Universal Serial Bus (USB) chargers with automatic sleep mode.

USB chargers are used to charge batteries of portable electronic devices including smartphones, tablets, laptops, wearable devices, and so on. Most USB chargers draw power from wall outlets. However, some USB chargers, particularly those integrated with battery-powered portable apparatus such as furniture, draw power from the battery that supplies power to the portable apparatus. USB chargers, regardless of their power source, consume power even when not connected to and not used to charge a battery of a portable electronic device. This type of power consumption can be problematic when a USB charger is integrated with a battery-powered portable equipment since the USB charger continues to drain the battery that supplies power to the portable equipment even when the USB charger is not charging a battery of a portable electronic device.

SUMMARY

A charger for charging a battery of a device comprises an input circuit, a converter circuit, an output circuit, and a switching circuit. The input circuit is configured to receive power from a power source. The converter circuit is configured to convert the power from a first voltage to a second voltage. The converter circuit is connected between an output of the input circuit and a signal ground of the charger. The signal ground is connected to a chassis ground of the charger. The output circuit is configured to output the second voltage to an output connector of the charger. The output circuit is connected between an output of the converter circuit supplying the second voltage, and the signal ground and the chassis ground of the charger. The switching circuit is configured to control the converter circuit. The switching circuit is connected between the output of the input circuit and an electrically conducting casing of the output connector. The switching circuit and the electrically conducting casing of the output connector are not connected to the signal ground and the chassis ground of the charger.

In another feature, the switching circuit is configured to disable the converter circuit when the input circuit receives power from the power source and when the device or a load is not connected to the output connector of the charger.

In another feature, the switching circuit is configured to enable the converter circuit when the input circuit receives power from the power source and when the device is connected to the output connector of the charger.

In another feature, when the device is connected to the output connector of the charger, the switching circuit is connected to the signal ground and the chassis ground of the charger via the device.

In another feature, the charger further comprises a transient voltage suppression device connected between the electrically conducting casing of the output connector of the charger, and the signal ground and the chassis ground of the charger.

In another feature, the output connector of the charger includes a first pin connected to the output circuit and a second pin connected to the signal ground and the chassis ground of the charger.

In another feature, an apparatus comprises the charger, the power source, and circuitry to operate the apparatus. The battery supplies power to the circuitry.

The power source is another battery.

In another feature, the apparatus includes furniture comprising one or more actuators and wherein the battery operates the one or more actuators.

In another feature, the apparatus includes a reclining chair, a reclining bed, or an adjustable standing desk.

In still other features, a furniture comprises an actuator to operate a feature of the furniture, circuitry included in the furniture to operate the actuator, a first battery included in the furniture to supply power to the circuitry, and a charger included in the furniture to charge a second battery of a portable electronic device via a connector arranged on the furniture. The charger comprises an input circuit, a converter circuit, an output circuit, and a switching circuit. The input circuit is configured to receive the power from the first battery. The converter circuit is configured to convert the power from a first voltage to a second voltage. The converter circuit is connected between an output of the input circuit and a signal ground of the charger. The signal ground is connected to a chassis ground of the charger. The output circuit is configured to output the second voltage to the connector. The output circuit is connected between an output of the converter circuit supplying the second voltage, and the signal ground and the chassis ground of the charger. The switching circuit is configured to control the converter circuit, wherein the switching circuit is connected between the output of the input circuit and an electrically conducting casing of the connector, wherein the switching circuit and the electrically conducting casing of the connector are not connected to the signal ground and the chassis ground of the charger.

In another feature, the switching circuit is configured to disable the converter circuit when the input circuit receives power from the first battery and when the portable electronic device or a load is not connected to the connector of the charger.

In another feature, the switching circuit is configured to enable the converter circuit when the input circuit receives power from the first battery and when the portable electronic device is connected to the connector of the charger.

In another feature, when the portable electronic device is connected to the connector of the charger, the switching circuit is connected to the signal ground and the chassis ground of the charger via the portable electronic device.

In another feature, the charger further comprises a transient voltage suppression device connected between the electrically conducting casing of the connector of the charger, and the signal ground and the chassis ground of the charger.

In another feature, the connector of the charger includes a first pin connected to the output circuit and a second pin connected to the signal ground and the chassis ground of the charger.

In another feature, the furniture includes a reclining chair, a reclining bed, or an adjustable standing desk.

In still other features, an apparatus comprises circuitry to operate the apparatus, a first battery included in the apparatus to supply power to the circuitry, and a charger included in the apparatus to charge a second battery of an external device via a connector arranged on the apparatus. The charger comprises an input circuit, a converter circuit, an output circuit, and a switching circuit. The input circuit is configured to receive the power from the first battery. The converter circuit is configured to convert the power from a first voltage to a second voltage. The converter circuit is connected between an output of the input circuit and a signal ground of the charger. The signal ground is connected to a chassis ground of the charger. The output circuit is configured to output the second voltage to the connector. The output circuit is connected between an output of the converter circuit supplying the second voltage, and the signal ground and the chassis ground of the charger. The switching circuit is configured to control the converter circuit. The switching circuit is connected between the output of the input circuit and an electrically conducting casing of the connector. The switching circuit and the electrically conducting casing of the connector are not connected to the signal ground and the chassis ground of the charger.

In another feature, the switching circuit is configured to disable the converter circuit when the input circuit receives power from the first battery and when the external device or a load is not connected to the connector of the charger.

In another feature, the switching circuit is configured to enable the converter circuit when the input circuit receives power from the first battery and when the external device is connected to the connector of the charger.

In another feature, when the external device is connected to the connector of the charger, the switching circuit is connected to the signal ground and the chassis ground of the charger via the external device.

In another feature, the charger further comprises a transient voltage suppression device connected between the electrically conducting casing of the connector of the charger, and the signal ground and the chassis ground of the charger.

In another feature, the connector of the charger includes a first pin connected to the output circuit and a second pin connected to the signal ground and the chassis ground of the charger.

In another feature, the apparatus includes a reclining chair, a reclining bed, an adjustable standing desk, a medical device, a gaming console, or a laptop computer.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
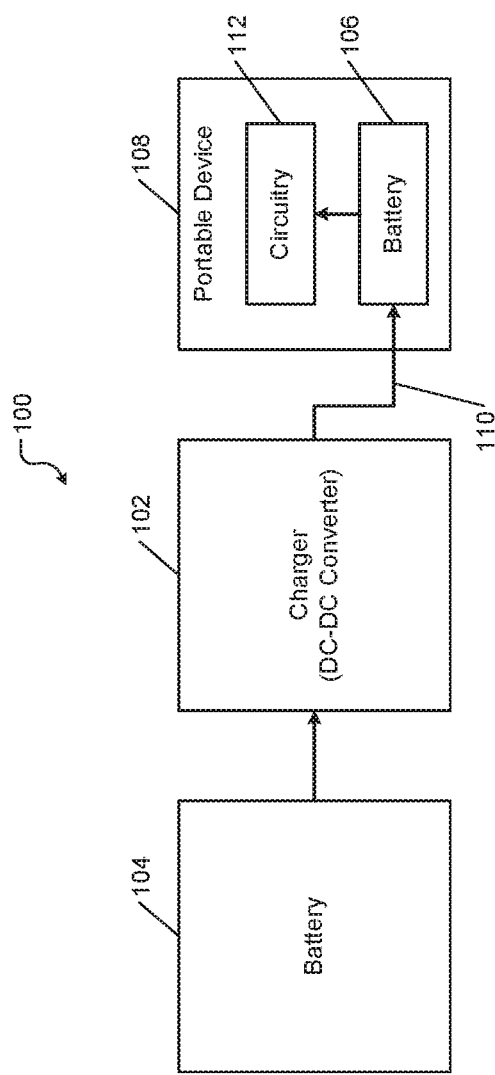
FIG. 1 shows a system comprising a charger that draws power from a battery and that charges a battery of a portable electronic device.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure relates to a modified design of a USB charger that draws power from a battery only when charging a battery of (or supplying power to) a portable electronic device. The USB charger according to the present disclosure draws an infinitesimal amount of power from the battery when the USB charger is not connected to a portable electronic device. Thus, the USB charger according to the present disclosure does not significantly drain the battery when the USB charger is not connected to a portable electronic device.

Throughout the present disclosure signal ground and chassis ground are referenced. A signal ground is a reference point from which a signal is measured. There may be more than one reference ground in a given circuit. The signal ground may also be split between digital and analog sections of a circuit into digital ground and analog ground to prevent noise of digital signals from interfering with and corrupting analog signals. Digital ground refers to a reference ground for digital logic ICs in a circuit. Analog ground refers to a reference ground for analog components of the circuit. The digital and analog grounds are joined at some point to allow signals to be referred to a common potential. This star point or analog/digital common point, is carefully chosen so as not to introduce digital currents into the ground of the analog part of the circuit.

A chassis ground is a ground-collection point that connects to a metal enclosure of an electrical device. A chassis ground is a ground-collection point that connects to the metal enclosure of an electrical device. A chassis ground may be used for shielding and grounding to prevent electrical shock. Mains' earth ground and the (theoretically) 0V power rails are all tied together and connected to the chassis at that one point. For example, with multilayer printed circuit boards, one or more of the conducting layers may be used as a chassis ground. A chassis ground is typically only made at one point. This prevents a return current path through an available but undesirable means and prevents current circulating through the chassis.

FIG. 1 shows a system 100 comprising a charger 102 that draws power from portable power sources such as a battery 104 and that charges a battery 106 of a portable electronic device 108. The battery 106 is rechargeable and supplies power to circuitry 112 of the portable electronic device 108. The charger 102 is essentially a DC-to-DC converter. For example, the battery 104 may supply a voltage V1, and the charger 102 may convert the voltage V1 to a voltage V2 that is suitable to charge the battery 106 of the portable electronic device 108, where V1>V2. For example, the portable electronic device 108 may include a smartphone, a tablet, a laptop, a wearable device such as a watch or wireless headphones, and so on. For charging the battery 106 of the portable electronic device 108, the charger 102 is connected to the portable electronic device 108 by a cable 110.

Figure 2:
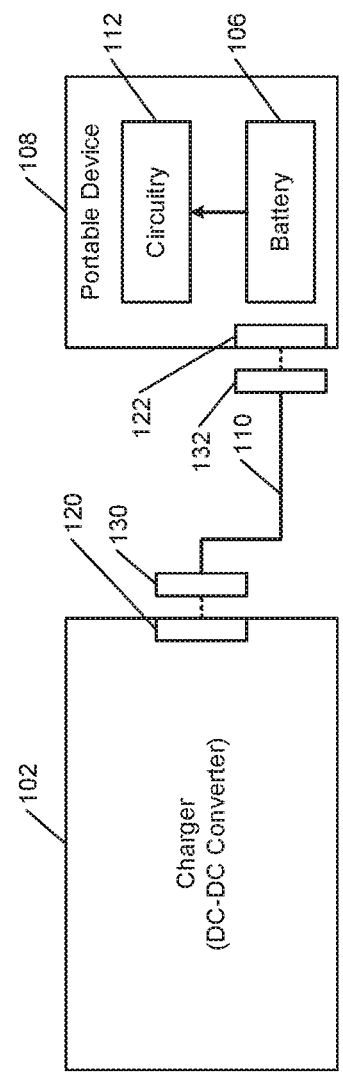
FIG. 2 shows the charger of FIG. 1 connected to a portable electronic device using a cable.
Figure 4:
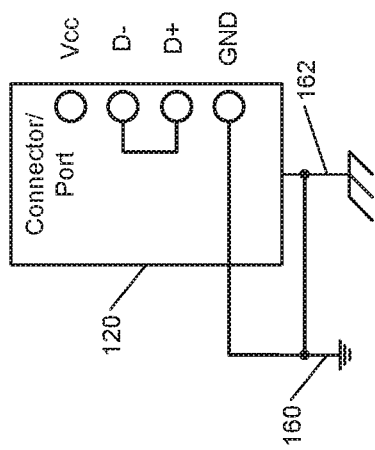
FIG. 4 shows an output connector of the charger of FIG. 1 in detail.
Figure 7:
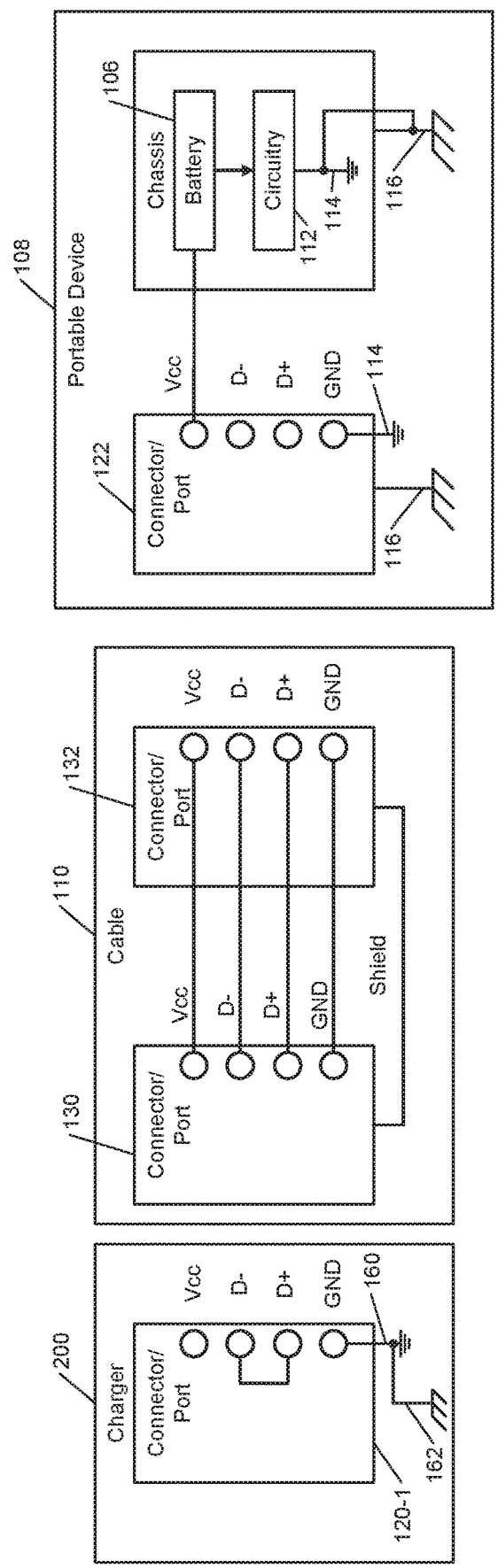
FIG. 7 shows the details of a cable and its connections to the charger of FIG. 5 and a portable electronic device.

FIG. 2 shows the connection between the charger 102 and the portable electronic device 108 using the cable 110. The charger 102 includes an output connector or port 120. The output connector 120 is a standard USB connector as shown in FIG. 4. The portable electronic device 108 includes an input connector or port 122. The input connector 122 is also a standard USB connector as shown in FIG. 4. The cable 110 includes a first connector 130 and a second connector 132. The cable 110 is a standard USB cable, and the first and second connectors 130, 132 are standard USB connectors as shown in FIG. 7. For charging the battery 106 of the portable electronic device 108, the first connector 130 of the cable 110 is connected to the output connector 120 of the charger 102, and the second connector 132 of the cable 110 is connected to the input connector 122 of the portable electronic device 108.

Figure 3:
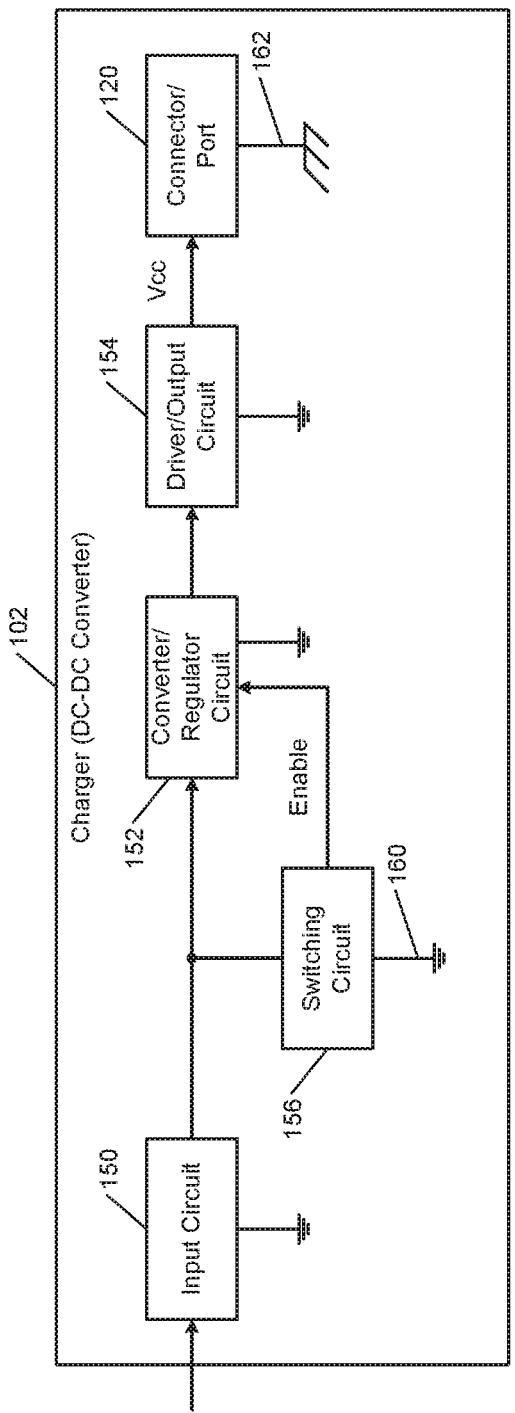
FIG. 3 shows a functional block diagram of the charger of FIG. 1.
Figure 10:
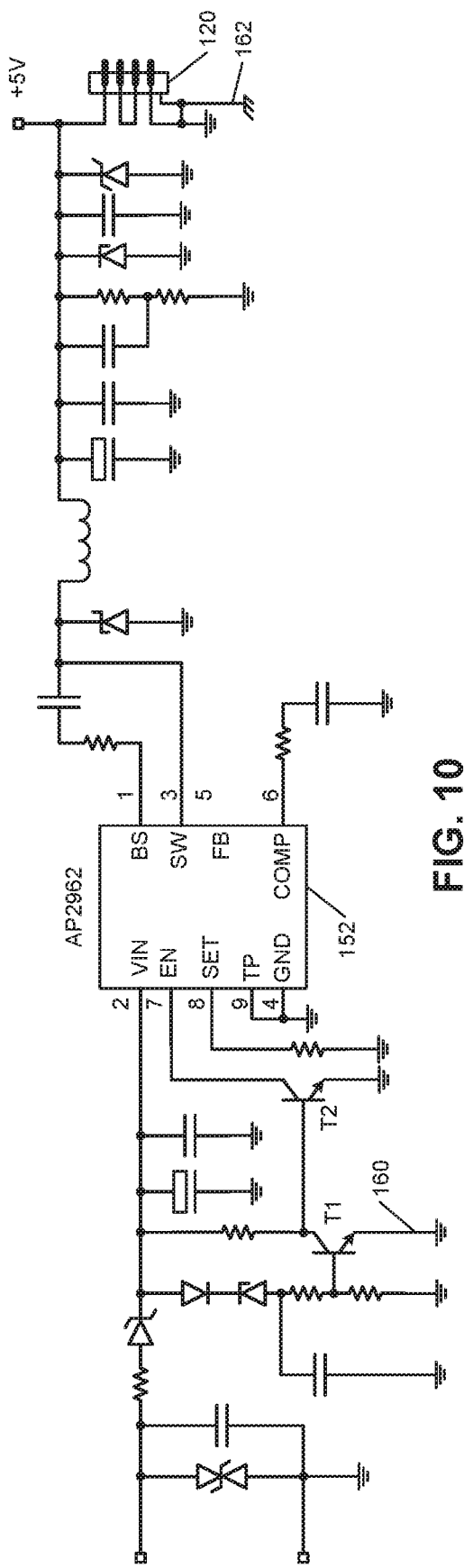
FIG. 10 shows an example of a circuit diagram of the charger of FIG. 1.

FIG. 3 shows a functional block diagram of the charger 102. An example of a detailed circuit diagram of the charger 102 is shown in FIG. 10. The charger 102 comprises an input circuit 150, a converter or regulator circuit 152, a driver or output circuit 154, a switching circuit 156, and the output connector 120.

The input circuit 150 receives power from the battery 104 to operate the charger 102. Based on the power received from the battery 104, the input circuit 150 provides an input voltage to the converter circuit 152. For example, the converter circuit 152 may include a voltage converter or regulator circuit. The converter circuit 152 converts the input voltage to an output voltage suitable for charging the battery 106 of the portable electronic device 108. The output circuit 154 provides the output voltage to the output connector 120. The input circuit 150 and the output circuit 154 may include other circuits such as but not limited to filter circuits, short circuit protection circuits, over-voltage protection circuits, current limiting as well as boosting circuits, and so on. Examples of these circuits are shown in FIG. 10.

For example, the converter circuit 152 may comprise an integrated circuit (IC) with an enable (control) pin that activates the IC. The switching circuit 156 comprises one or more switches (e.g., transistors) connected to the enable pin of the IC to enable (i.e., activate) the converter circuit 152. Again, examples of these circuits are shown in FIG. 10.

The input circuit 150, the converter circuit 152, the output circuit 154, and the switching circuit 156 are connected to a signal ground 160 of the charger 102. The converter circuit 152 is connected between an output of the input circuit 150 and the signal ground 160 of the charger 102. The switching circuit 156 is connected between the output of the input circuit 150 and the signal ground 160 of the charger 102. The switching circuit 156 supplies a signal having a proper logic state (e.g., high or low) to the enable pin of the converter circuit 152 IC to enable (i.e., activate) the converter circuit 152. The output circuit 154 is connected between an output of the converter circuit that supplies the voltage (Vcc) to the output connector 120 and the signal ground 160 of the charger 102.

FIG. 4 shows the output connector 120 of the charger 102 in detail. An exterior or casing (also called shroud) of the output connector 120 is made of a metal (i.e., an electrically conducting material). The output connector 120 includes four pins: a power supply pin (Vcc), a ground pin (GND), and two data pins (D+ and D−) as shown. The pins are insulated from each other and from the metal casing of the output connector 120. In some chargers the two data pins (D+ and D−) are connected to each other as shown.

The GND pin of the output connector 120 is connected to the signal ground 160 of the charger 102. The charger 102 is typically enclosed in a chassis. The metal casing of the output connector 120 is connected to the chassis, which is called a chassis ground 162. The signal ground 160 and the chassis ground 162 of the charger 102 are connected to each other to protect the charger 102 from electrostatic discharge (ESD) and to meet electromagnetic compatibility (EMC) standards.

Since the switching circuit 156 is connected to the signal ground 160, the output of the switching circuit 156, which is connected to the enable pin of the converter circuit 152, is always in a logic state that enables the converter circuit 152. Therefore, the converter circuit 152 is always enabled, regardless of whether the portable electronic device 108 is connected to the output connector 120 of the charger 102. Accordingly, the charger 102 continues to draw power from the battery 104 even when the charger 102 is not charging the battery 106 of the portable electronic device 108.

Figure 5:
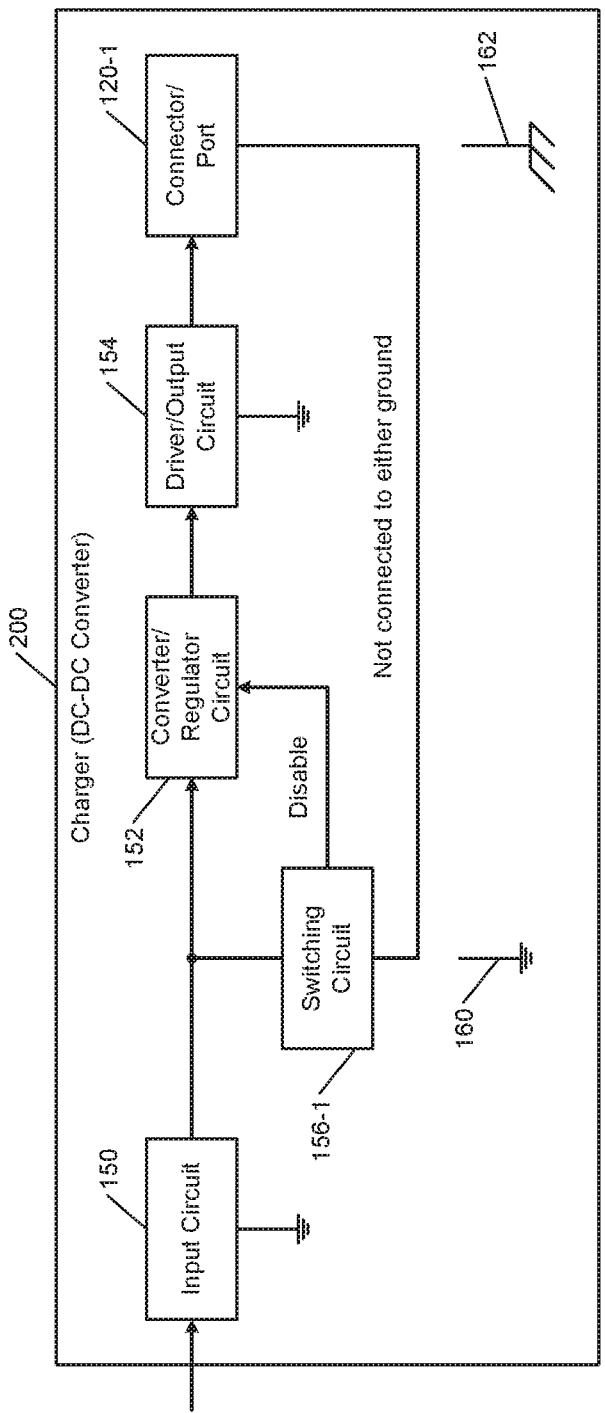
FIG. 5 shows an example of a charger according to the present disclosure.
Figure 6:
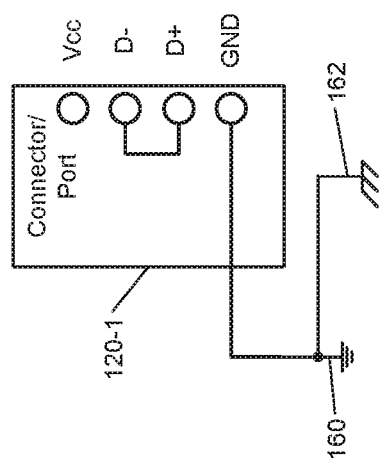
FIG. 6 shows an output connector of the charger of FIG. 5 in detail.
Figure 11:
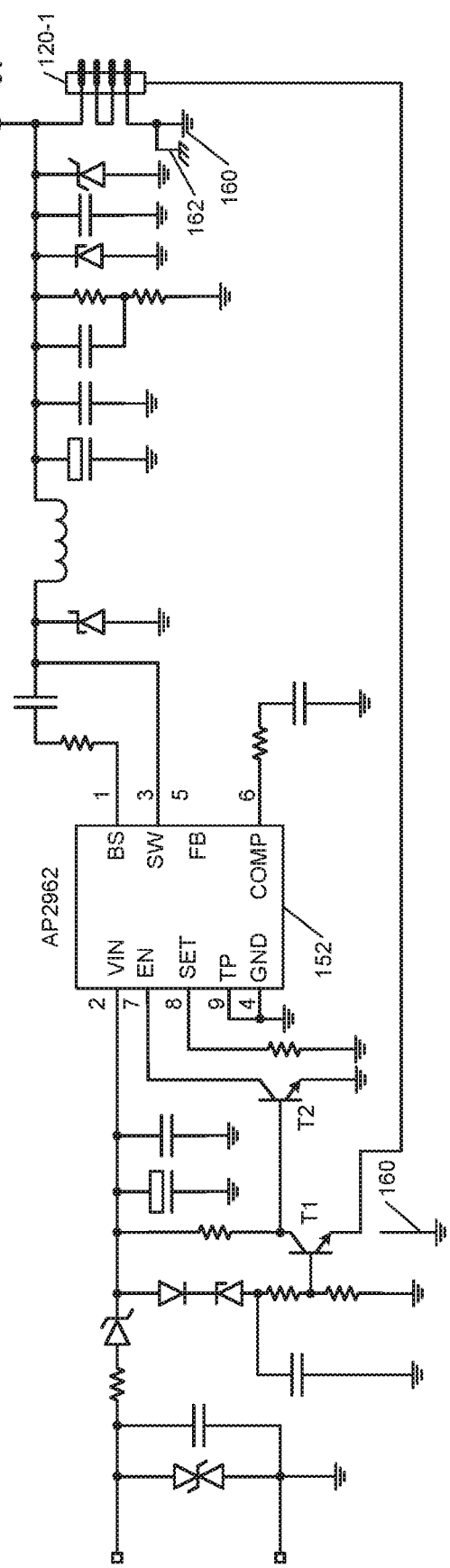
FIG. 11 shows an example of a circuit diagram of the charger of FIG. 5.

FIGS. 5 and 6 show an example of a charger 200 according to the present disclosure. The charger 200 is identical to the charger 102 in all respects except the following. An example of a detailed circuit diagram of the charger 200 is shown in FIG. 11. As FIG. 5 shows, unlike the switching circuit 156 of the charger 102, the switching circuit 156-1 of the charger 200 is not connected to the signal ground 160. Instead, the switching circuit 156-1 is connected between the output of the input circuit 150 and the metal casing of the output connector 120-1 of the charger 200. Further, the metal casing of the output connector 120-1 is not connected to the chassis ground 162. Thus, the switching circuit 156-1 is also not connected to the chassis ground 162. That is, the switching circuit 156-1 and the output connector 120-1 of the charger 200 are not connected to the signal ground 160 and the chassis ground 162.

FIG. 6 shows the output connector 120-1 of the charger 200 in detail. The GND pin of the output connector 120-1 is connected to the signal ground 160 and the chassis ground 162. However, the chassis ground 162 is disconnected from the metal casing of the output connector 120-1. Consequently, the metal casing of the output connector 120-1 is not connected to the chassis ground 162 and the signal ground 160. Accordingly, the switching circuit 156-1, which is connected to the metal casing of the output connector 120-1, is also not connected to the chassis ground 162 and the signal ground 160.

Consequently, the output of the switching circuit 156-1, which is connected to the enable pin of the converter circuit 152, is not in a logic state that enables the converter circuit 152. Therefore, the converter circuit 152 of the charger 200 is not enabled when the portable electronic device 108 is not connected to the charger 200 via the output connector 120-1.

Accordingly, the converter circuit 152 of the charger 200 is normally disabled when nothing (i.e., no load) is connected to the output connector 120-1 of the charger 200. Therefore, the charger 200 draws only an infinitesimal amount of power from the battery 104 when the charger 200 is not connected to any load such as the portable electronic device 108.

FIG. 7 shows the details of the cable 110 and its connections to the charger 200 and the portable electronic device 108. The cable 110 includes five conductors that provide five connections between its first and second connectors 130, 132. A first conductor connects the Vcc or power supply pins of the first and second connectors 130, 132. A second conductor connects the D− pins of the first and second connectors 130, 132. A third conductor connects the D+ pins of the first and second connectors 130, 132. A fourth conductor connects the GND pins of the first and second connectors 130, 132. A fifth conductor, which is a shield made of electrically conducting material around the four conductors, connects the metal casings of the first and second connectors 130, 132.

In the portable electronic device 108, the circuitry 112 of the portable electronic device 108 and the GND pin of the input connector 122 are connected to a signal ground 114 of the portable electronic device 108. Further, the chassis that encloses the circuitry 112 and the battery 106 of the portable electronic device 108 is connected to a chassis ground 116 of the portable electronic device 108. The signal ground 114 is connected to the chassis ground 116. Additionally, the metal casing of the input connector 122 is connected to the chassis ground 116. Accordingly, the metal casing of the input connector 122 is connected to the chassis ground 116 and the signal ground 114 of the portable electronic device 108.

Figure 8:
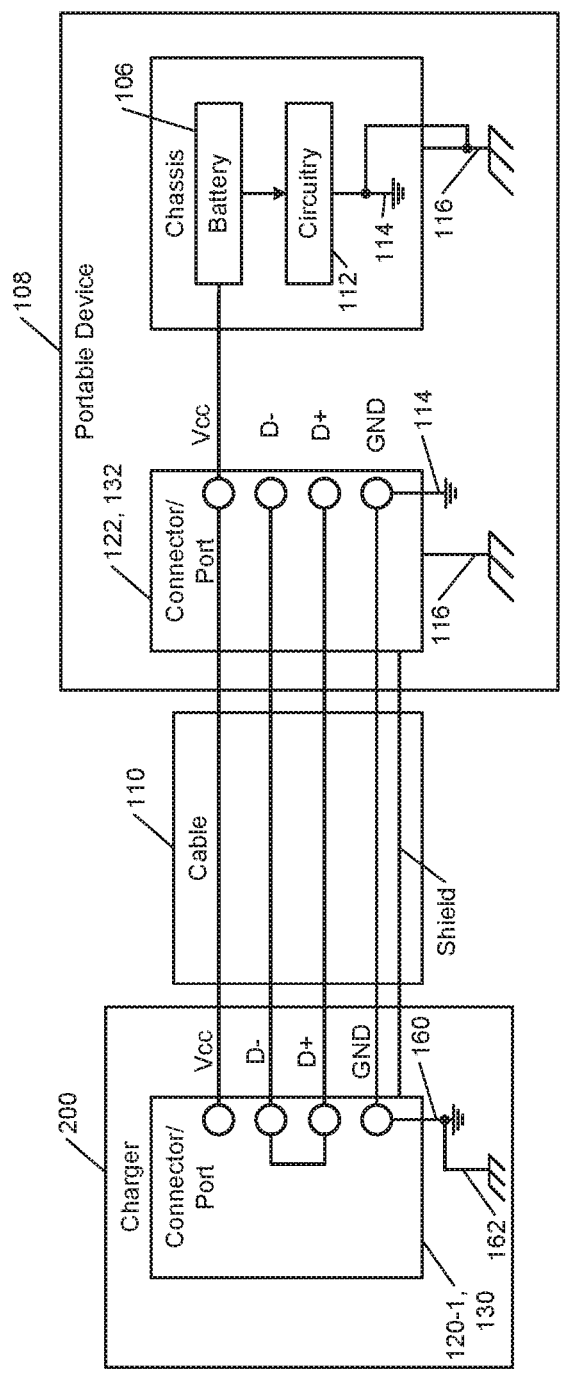
FIG. 8 shows a portable electronic device connected to the charger of FIG. 5 via the cable of FIG. 7.

FIG. 8 shows the portable electronic device 108 connected to the charger 200 via the cable 110. The first connector 130 of the cable 110 is connected to the output connector 120-1 of the charger 200. The second connector 132 of the cable 110 is connected to the input connector 122 of the portable electronic device 108. Accordingly, the GND pin of the output connector 120-1 of the charger 200 is connected to the GND pin of the input connector 122 of the portable electronic device 108 via the cable 110. Therefore, the signal ground 160 and the chassis ground 162 of the charger 200, which are connected to the GND pin of the output connector 120-1 of the charger 200, are connected to the signal ground 114 of the portable electronic device 108 via the cable 110.

Further, the metal casing of the output connector 120-1 of the charger 200 is connected to the metal casing of the input connector 122 of the portable electronic device 108 via the shield of the cable 110. Since the metal casing of the input connector 122 of the portable electronic device 108 is connected to the chassis ground 116 and the signal ground 114 of the portable electronic device 108, and since the signal ground 160 and the chassis ground 162 of the charger 200 are connected to the signal ground 114 of the portable electronic device 108 via the cable 110, the metal casing of the output connector 120-1 of the charger 200 is connected to the chassis ground 116 and the signal ground 114 of the portable electronic device 108 and to the signal ground 160 and the chassis ground 162 of the charger 200 via the cable 110.

Figure 9:
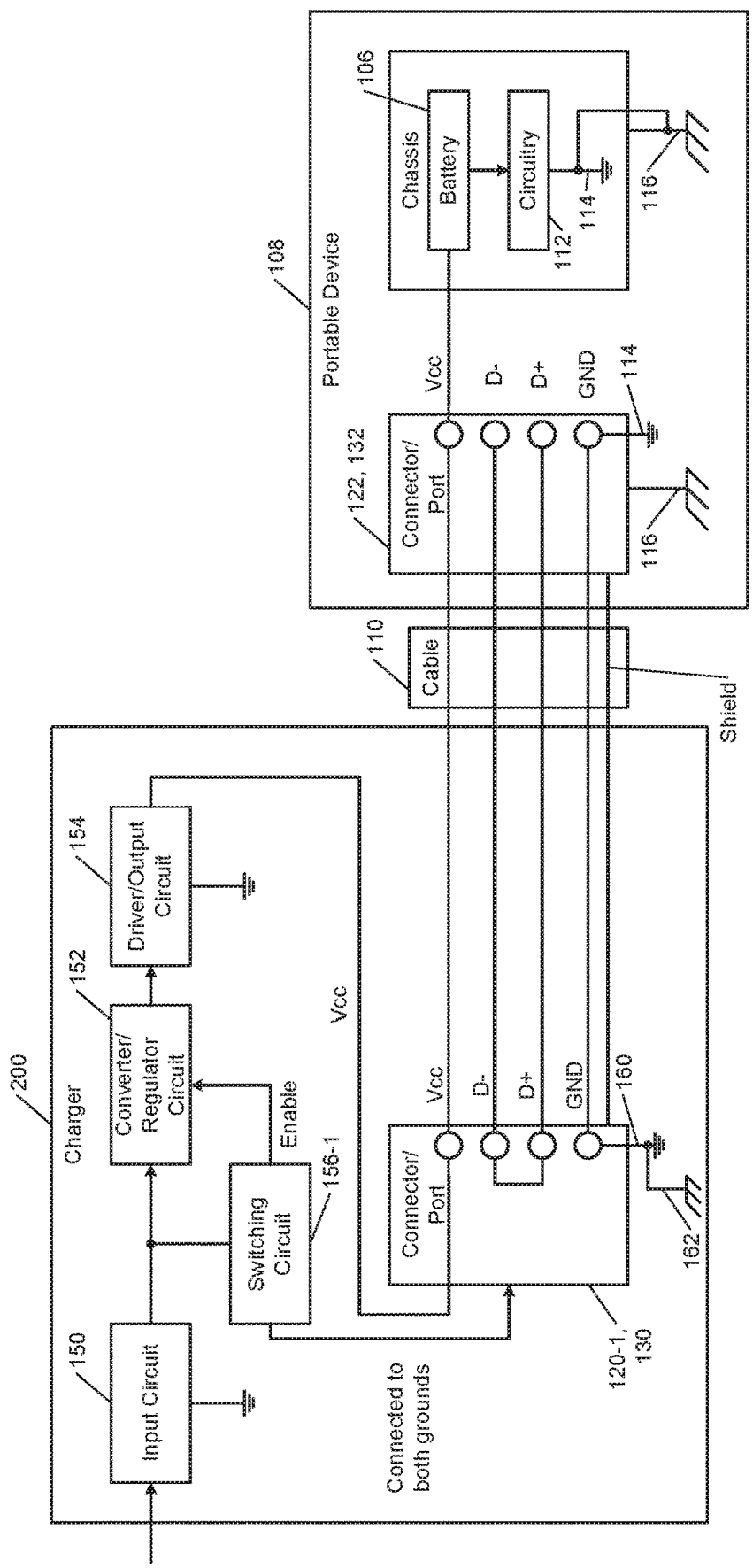
FIG. 9 shows the operation of the charger of FIG. 5 when a portable electronic device is connected to the charger of FIG. 5 via the cable of FIG. 7.

FIG. 9 shows that the switching circuit 156-1 of the charger 200 gets connected to the chassis ground 116 and the signal ground 114 of the portable electronic device 108 and to the signal ground 160 and the chassis ground 162 of the charger 200 when the portable electronic device 108 is connected to the charger 200 via the cable 110. Thus, the switching circuit 156-1 of the charger 200 gets connected between the output of the input circuit 150 and the signal ground 160 (and also and the chassis ground 162) of the charger 200 when the portable electronic device 108 is connected to the charger 200 via the cable 110.

Accordingly, the output of the switching circuit 156-1 of the charger 200, which is connected to the enable pin of the converter circuit 152, changes state (i.e., toggles) to a logic state that enables the converter circuit 152 when the portable electronic device 108 is connected to the charger 200 via the cable 110. Therefore, the converter circuit 152 of the charger 200 is enabled when the portable electronic device 108 is connected to the charger 200 via the output connector 120-1. Accordingly, the output circuit 154 of the charger 200 supplies power to the portable electronic device 108 via the output connector 120-1 of the charger 200, the cable 110, and the input connector 122 of the portable electronic device 108. The power supplied by the charger 200 via the cable 110 charges the battery 106 of the portable electronic device 108.

The switching circuit 156-1 of the charger 200 is disconnected from the signal ground 160 (and also and the chassis ground 162) of the charger 200 when the portable electronic device 108 is disconnected from the charger 200. The cable 110 may or may not be removed from the output connector 120-1 of the charger 200. So long as the portable electronic device 108 is disconnected from the charger 200, the switching circuit 156-1 of the charger 200 is disconnected from the signal ground 160 (and also and the chassis ground 162) of the charger 200.

Once the portable electronic device 108 is disconnected from the charger 200, the output of the switching circuit 156-1, which is connected to the enable pin of the converter circuit 152 of the charger 200, toggles (i.e., changes state) again and is not in a logic state that enables the converter circuit 152. Therefore, the converter circuit 152 of the charger 200 is not enabled when the portable electronic device 108 is not connected to the charger 200 via the output connector 120-1. Accordingly, the converter circuit 152 of the charger 200 is again disabled when the portable electronic device 108 is disconnected from the charger 200, and the charger 200 draws only an infinitesimal amount of power from the battery 104 when the charger 200 is not connected to the portable electronic device 108.

Accordingly, the connection of the portable electronic device 108 and the cable 110 to the charger 200 operates as a virtual switch between the switching circuit 156-1 and the signal ground 160 and the chassis ground 162 of the charger 200. When the portable electronic device 108 is connected to the charger 200 via the cable 110, the virtual switch is closed, and the switching circuit 156-1 is connected to the signal ground 160 and the chassis ground 162 (i.e., between the output of the input circuit 150, and the signal ground 160 and the chassis ground 162). When the virtual switch is closed, the switching circuit 156-1 enables, turns on, or wakes up the converter circuit 152 of the charger 200, which supplies power to the battery 106 of the portable electronic device 108.

Conversely, when the portable electronic device 108 is disconnected from the charger 200, the virtual switch is opened, and the switching circuit 156-1 is disconnected from the signal ground 160 and the chassis ground 162 of the charger 200. When the virtual switch is opened, the switching circuit 156-1 disables or turns off the converter circuit 152 of the charger 200 (or puts the converter circuit 152 of the charger 200 in a sleep mode) so that the charger 200 does not significantly drain the battery 104 and does not supply power to the output connector 120-1 of the charger 200.

FIG. 10 shows an example of the charger 102. The charger 102 comprises the converter/regulator circuit (IC) 152. Transistors T1 and T2 constitute the switching circuit 156. Other components to the left of the converter circuit 152 constitute the input circuit 150. Components to the right of the converter circuit 152 constitute the output circuit 154. When the input circuit 150 of the charger 102 is connected to the battery 104, the converter circuit 152 of the charger 102 is always enabled since the emitter of T1 of the charger 102 is connected to the signal ground 160, which is also connected to the chassis ground 162, and the output of T2 is in a logic state that enables the converter circuit 152 of the charger 102. Therefore, the charger 102 continuously draws power from the battery 104 and supplies power to the output connector 120 regardless of whether a load (e.g., the portable electronic device 108) is connected to the charger 102, which drains the battery 104.

FIG. 11 shows an example of the charger 200. The charger 200 comprises the converter/regulator circuit (IC) 152. Transistors T1 and T2 constitute the switching circuit 156-1. Other components to the left of the converter circuit 152 constitute the input circuit 150. Components to the right of the converter circuit 152 constitute the output circuit 154. When the input circuit 150 of the charger 200 is connected to the battery 104 and when nothing (i.e., no load) is connected to the output connector 120-1, the converter circuit 152 of the charger 200 is disabled since the emitter of T1 of the charger 200 is not connected to the signal ground 160 and the chassis ground 162 and is instead connected to the metal casing of the output connector 120-1, which is also not connected to the signal ground 160 and the chassis ground 162, and therefore the output of T2 of the charger 200 is in a logic state that disables the converter circuit 152. The charger 200 does not supply power to the output connector 120-1.

Figure 12:
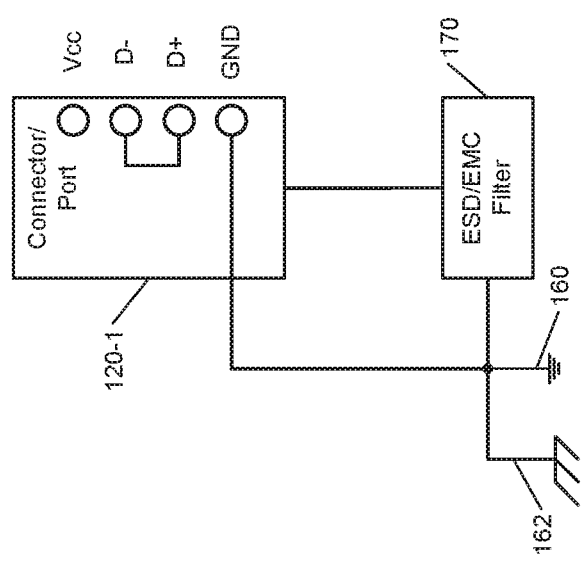
FIG. 12 shows a filter that can be connected between separated signal ground and chassis ground of the charger of FIG. 5.

FIG. 12 shows an ESD/EMC filter 170 that can be connected between the GND pin of the output connector 120-1 of the charger 200 (i.e., to the signal ground 160 and the chassis ground 162 of the charger 200) and the metal casing of the output connector 120-1 of the charger 200, which is not connected to the signal ground 160 and the chassis ground 162 of the charger 200. For example, the ESD/EMC filter 170 can comprise two separate filters—an ESD filter and an EMC filter—connected in parallel. For example, the ESD filter portion of the ESD/EMC filter 170 can include electrostatic discharge pin(s) capacitor(s), diode(s), transient voltage suppression (TVS) diode(s), resistor(s), metal oxide varistor(s) (MOVs), and/or gas discharge tube(s). The EMC filter portion of the ESD/EMC filter 170 can include capacitor(s), capacitors and inductors, and/or resistor(s). These components, when used in the ESD/EMC filter 170, maintain the separation between the metal casing of the connector 120-1 of the charger 200 and the signal ground 160 and the chassis ground 162 of the charger 200 because these components normally act as open circuits. Only when a transient such as an ESD occurs, these components momentarily act as short circuits and conduct current resulting from the transient. Accordingly, these components are also called transient voltage suppressors or TVS devices.

Figure 13:
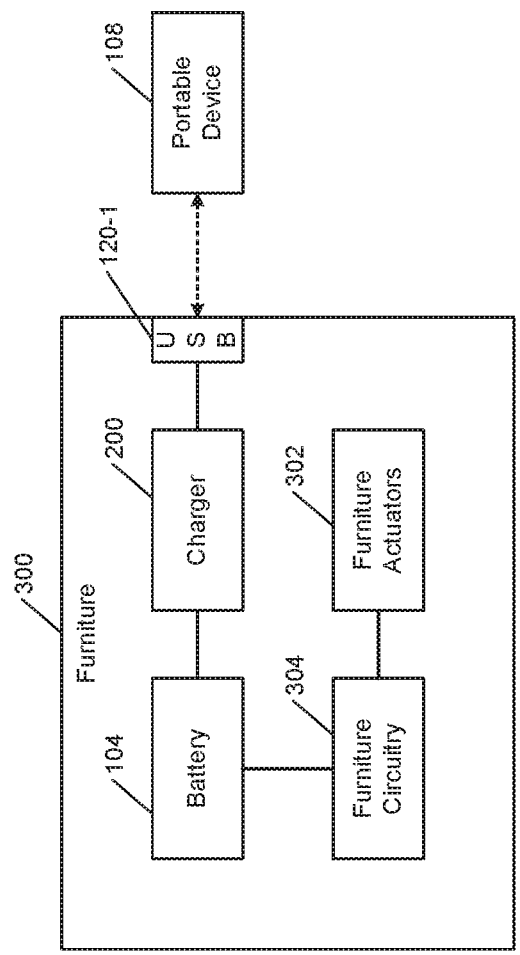
FIG. 13 shows an example of implementing the charger of FIG. 5 in an item of furniture.

FIG. 13 schematically shows an example of an application of the teachings of the present disclosure. For example, the charger 200 can be integrated with a piece of furniture 300. For example, the furniture 300 may include a reclining chair or bed, a standing desk, and so on. The furniture 300 may include one or more actuators 302 that operate one or more features of the furniture 300 (e.g., a reclining mechanism of a reclining chair or bed, a mechanism that adjusts the height of a standing desk, and so on). The actuators 302 can be operated using circuitry 304.

In some instances, it may be inconvenient to draw power from a wall outlet to power the circuitry 304. Accordingly, the battery 104 may be integrated with the furniture 300 and used instead to supply power to the circuitry 304. In addition, a convenience in the form of a USB port may embedded or integrated in the furniture so that USB devices such as smartphones, laptops, and so on (e.g., element 108) can be charged and/or powered via the USB port on the furniture 300. In such instances, the charger 200 may be used to supply power to these devices via its output connector 120-1 (i.e., USB port) in the manner described above. The charger 200 prevents the battery 104 from draining when a device is not connected to the USB port on the furniture 300 (i.e., the output connector 120-1 of the charger 200). Thus, the power of the battery 104 is conserved and is available to operate the circuitry 304 that operates the actuators 302 of the furniture 300. In other words, the charger 200 can prolong the life of the battery 104 in the furniture 300.

The charger 200 can be used in many other systems that include a battery (e.g., element 104) as a source of power for the systems and where the charger 200 draws power from the battery to supply power to a device (e.g., element 108) via the USB port of the charger 200. For example, the charger 200 can be used in vehicles and other modes of transportation such as boats, airplanes, and so on that rely on batteries for at least part of their operations and where depletion of the batteries by chargers can be detrimental to their operations.

The teaching of the present disclosure can be applied to chargers with any kind of USB connectors or ports other than that shown. For example, the USB connectors can be of different size and shape and can include different number of pins than that shown. Further, the USB connector of the charger (e.g., element 120-1) may be of a different form factor than the USB connector (e.g., element 122) of the load (e.g., element 108). In such situations, the first and second connectors 130,132 of the cable 110 may be different as well. In some instances, the cable 110 may be replaced by adapters having the first and second connectors 130,132 and a shield similar to that of the cable 110.

Furthermore, the teachings of the present disclosure can be applied to a variety of chargers, DC-to-DC converters, power supplies, and so on that are used to power a multitude of portable devices. Non-limiting examples of portable devices, in addition to those mentioned above, include medical devices, video game consoles, personal computing devices, and a variety of other gadgets. For example, a technician operating a portable battery-powered medical diagnostic equipment can connect his/her phone to a charger embedded in the equipment to charge his/her phone while performing diagnostics using the equipment. For example, a person playing a game on a battery-powered video game console can charge his/her phone while playing the game on the console.

People also often charge gadgets by connecting them to USB ports available on laptop computers, which are typically battery powered. While the present disclosure contemplates a laptop as a load (i.e., the charger of the present disclosure can be used to charge the battery of a laptop), the laptop also includes a USB charger powered by the laptop battery. Accordingly, the laptop battery can be the power source in such instances, and using the charger of the present disclosure in the laptop can conserve the power of the laptop battery.

In general, the teachings of the present disclosure can be applied to any powering device that receives power from a power source, particularly a battery, and that supplies power to a detachable load. The teachings are particularly useful when the battery is also used to primarily operate a device in addition to secondarily operating the powering device and when conserving the power of the battery to operate the device is essential by automatically putting the powering device in sleep mode while the powering device is not connected to a load.

The teaching of separating a switching circuit from the signal ground and the chassis ground of a circuit and then activating and deactivating the circuit by controlling the opening and closing of the connection between the switching circuit and the signal ground and the chassis ground using a virtual switch in the form of connecting and disconnecting a load to the circuit can be applied in many other applications. For example, the teaching can be used to control a switching relay, enable/disable a circuit, and so on.

In addition, the teachings of the present disclosure can be used to implement a switch to directly control the power supplied to a charging circuit such as a charger or a DC-to-DC converter. For example, the teachings are not limited to situations where a battery is a source of power for the charging circuit and where conserving the battery power is essential. Rather, the teachings can be also be applied in situations where a charging circuit is directly connected to and draws power from a wall outlet since the teachings can conserve the power supplied to the wall outlet when the charging circuit is not connected to a load (e.g., element 108) and is not charging a battery of a device.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A charger configured to charge a battery of a device, the charger comprising:
    an input circuit configured to receive power from a power source;
    a converter circuit configured to convert the power from a first voltage to a second voltage, wherein the converter circuit is connected between an output of the input circuit and a signal ground of the charger, and wherein the signal ground is connected to a chassis ground of the charger;
    an output circuit configured to output the second voltage to an output connector of the charger, wherein the output circuit is connected between an output of the converter circuit supplying the second voltage, and the signal ground and the chassis ground of the charger; and
    a switching circuit configured to control the converter circuit, wherein the switching circuit is connected between the output of the input circuit and an electrically conducting casing of the output connector, wherein the switching circuit and the electrically conducting casing of the output connector are not connected to the signal ground and the chassis ground of the charger;

wherein the switching circuit is configured to disable the converter circuit when the input circuit receives power from the power source and when the device or a load is not connected to the output connector of the charger.

2. The charger of claim 1 wherein the switching circuit is configured to enable the converter circuit when the input circuit receives power from the power source and when the device is connected to the output connector of the charger.

3. The charger of claim 1 wherein when the device is connected to the output connector of the charger, the switching circuit is connected to the signal ground and the chassis ground of the charger via the device.

4. The charger of claim 1 further comprising a transient voltage suppression device connected between the electrically conducting casing of the output connector of the charger, and the signal ground and the chassis ground of the charger.

5. The charger of claim 1 wherein the output connector of the charger includes a first pin connected to the output circuit and a second pin connected to the signal ground and the chassis ground of the charger.

6. An apparatus comprising:
the charger of claim 1;
the power source; and
circuitry to operate the apparatus,
wherein the battery supplies power to the circuitry, and
wherein the power source is another battery.

7. The apparatus of claim 6, wherein the apparatus includes furniture comprising one or more actuators and wherein the battery operates the one or more actuators.

8. The apparatus of claim 6 wherein the apparatus includes a reclining chair, a reclining bed, or an adjustable standing desk.

9. A furniture comprising:
an actuator to operate a feature of the furniture;
circuitry included in the furniture to operate the actuator;
a first battery included in the furniture to supply power to the circuitry; and
a charger included in the furniture to charge a second battery of a portable electronic device via a connector arranged on the furniture,
wherein the charger comprises:
an input circuit configured to receive the power from the first battery;
a converter circuit configured to convert the power from a first voltage to a second voltage, wherein the converter circuit is connected between an output of the input circuit and a signal ground of the charger, and wherein the signal ground is connected to a chassis ground of the charger;
an output circuit configured to output the second voltage to the connector, wherein the output circuit is connected between an output of the converter circuit supplying the second voltage, and the signal ground and the chassis ground of the charger; and
a switching circuit configured to control the converter circuit, wherein the switching circuit is connected between the output of the input circuit and an electrically conducting casing of the connector, wherein the switching circuit and the electrically conducting casing of the connector are not connected to the signal ground and the chassis ground of the charger;
wherein the switching circuit is configured to disable the converter circuit when the input circuit receives power from the first battery and when the portable electronic device or a load is not connected to the connector of the charger.

10. The furniture of claim 9 wherein the switching circuit is configured to enable the converter circuit when the input circuit receives power from the first battery and when the portable electronic device is connected to the connector of the charger.

11. The furniture of claim 9 wherein when the portable electronic device is connected to the connector of the charger, the switching circuit is connected to the signal ground and the chassis ground of the charger via the portable electronic device.

12. The furniture of claim 9 wherein the charger further comprises a transient voltage suppression device connected between the electrically conducting casing of the connector of the charger, and the signal ground and the chassis ground of the charger.

13. The furniture of claim 9 wherein the connector of the charger includes a first pin connected to the output circuit and a second pin connected to the signal ground and the chassis ground of the charger.

14. The furniture of claim 9 wherein the furniture includes a reclining chair, a reclining bed, or an adjustable standing desk.

15. An apparatus comprising:
circuitry to operate the apparatus;
a first battery included in the apparatus to supply power to the circuitry; and
a charger included in the apparatus to charge a second battery of an external device via a connector arranged on the apparatus,
wherein the charger comprises:
an input circuit configured to receive the power from the first battery;
a converter circuit configured to convert the power from a first voltage to a second voltage, wherein the converter circuit is connected between an output of the input circuit and a signal ground of the charger, and wherein the signal ground is connected to a chassis ground of the charger;
an output circuit configured to output the second voltage to the connector, wherein the output circuit is connected between an output of the converter circuit supplying the second voltage, and the signal ground and the chassis ground of the charger; and
a switching circuit configured to control the converter circuit, wherein the switching circuit is connected between the output of the input circuit and an electrically conducting casing of the connector, wherein the switching circuit and the electrically conducting casing of the connector are not connected to the signal ground and the chassis ground of the charger
wherein the switching circuit is configured to disable the converter circuit when the input circuit receives power from the first battery and when the external device or a load is not connected to the connector of the charger.

16. The apparatus of claim 15 wherein the switching circuit is configured to enable the converter circuit when the input circuit receives power from the first battery and when the external device is connected to the connector of the charger.

17. The apparatus of claim 15 wherein when the external device is connected to the connector of the charger, the switching circuit is connected to the signal ground and the chassis ground of the charger via the external device.

18. The apparatus of claim 15 wherein the charger further comprises a transient voltage suppression device connected between the electrically conducting casing of the connector of the charger, and the signal ground and the chassis ground of the charger.

19. The apparatus of claim 15 wherein the connector of the charger includes a first pin connected to the output circuit and a second pin connected to the signal ground and the chassis ground of the charger.

20. The apparatus of claim 15 wherein the apparatus includes a reclining chair, a reclining bed, an adjustable standing desk, a medical device, a gaming console, or a laptop computer.

\* \* \* \* \*